United States Patent [19]

Wada

[11] Patent Number: 5,617,216

[45] Date of Patent: Apr. 1, 1997

[54] IMAGE FORMATION DEVICE WITH BINARY/HALFTONE PIXEL DETERMINATION

[75] Inventor: Koji Wada, Tokyo, Japan

[73] Assignee: NEC Corporation, Japan

[21] Appl. No.: 271,082

[22] Filed: Jul. 6, 1994

[30] Foreign Application Priority Data

Jul. 7, 1993 [JP] Japan ................................. 5-192954

[51] Int. Cl.⁶ ................................. H04N 1/40; H04N 1/29
[52] U.S. Cl. ......................... 358/298; 358/300; 358/456; 358/462
[58] Field of Search ................................. 358/296, 298, 358/300, 453, 456–458, 462, 465, 466; 347/131, 252; 382/176, 205, 264, 266, 269, 282, 284, 302, 308

[56] References Cited

U.S. PATENT DOCUMENTS

| | | | |
|---|---|---|---|
| 4,707,745 | 11/1987 | Sakano | 358/298 X |
| 4,953,013 | 8/1990 | Tsuji et al. | 358/462 X |
| 4,996,603 | 2/1991 | Kanemitsu et al. | 358/462 |
| 5,001,576 | 3/1991 | Tanaka et al. | 358/462 |
| 5,408,336 | 4/1995 | Ishida | 358/466 X |
| 5,432,611 | 7/1995 | Haneda et al. | 358/298 |

*Primary Examiner*—Eric Frahm
*Attorney, Agent, or Firm*—Ostrolenk, Faber, Gerb & Soffen, LLP

[57] ABSTRACT

An image formation device includes a matrix formation circuit, a pixel identification circuit, a binarization processing circuit, a halftone processing circuit, and a synthesizing circuit. The matrix formation circuit forms a data matrix window successively shifting. The pixel identification circuit determines whether an objective pixel is a binary or a halftone by determining whether each of the pixel signals in the data matrix window is a binary or a halftone. If the objective pixel is determined to be a binary, the binarization processing circuit processes the objective pixel signal. If the objective pixel is determined to be a halftone, the halftone processing circuit processes the objective pixel signal. These objective pixel signals are synthesized to form the image signal fed into a laser printing system.

12 Claims, 8 Drawing Sheets

FIG.6A

| M1 | M2 | M3 |
|----|----|----|
| M4 | M5 | M6 |
| M7 | M8 | M9 |

M1–M9 : EACH COMPRISING 8BITS

FIG.6B

| B1 | B2 | B3 |
|----|----|----|
| B4 | B5 | B6 |
| B7 | B8 | B9 |

WITHOUT SMOOTHING

WITH SMOOTHING

IMAGE FORMATION DEVICE WITH BINARY/HALFTONE PIXEL DETERMINATION

BACKGROUND OF THE INVENTION

1. Field of the Invention

The present invention relates to an electrophotographic printer and, in particular, to an image formation device for forming an image signal comprising pulse signals each determining a laser pulse width, based on digital multivalued pixel data.

2. Description of the Related Prior Art

In an electrophotographic printer, a latent image is electrostatically formed on a photoreceptor scanned by a laser beam switching on and off according to image signals in pixels, and a visible image is developed by applying toner to the electrostatically charged photoreceptor. Exposure time and toner concentration of the photoreceptor have a relationship such that toner concentration gradually varies with exposure time within the range L as shown in FIG. 1. Therefore, halftones can be achieved by controlling the exposure time, or laser pulse width, within the region L.

A conventional image formation device is designed to operate in the range L. Specifically, on receipt of input digital data indicating gradations for each pixel, the conventional device generates an image signal comprising pixel pulse signals each having a pulse width corresponding to duration time of the laser beam which is varied in the range L of FIG. 1.

In the range L, however, toner attracted to the electrostatically charged areas on the photoreceptor is scattered rather than concentrated. Thus, when images containing photographs and characters or figures are printed, photographs are successfully transformed to printed halftone images but the characters and figures fail to provide clear outlines.

For binarization images such as characters or figures, there has been a method of improving resolution in the primary scanning direction to smooth the outlines thereof. In such a smoothing technique, the pulse width of a laser beam for an objective pixel must be controlled finely using data of surrounding pixels to improve resolution. However, the smoothing technique cannot be applicable to the conventional image formation device because it uses all input data as gradation data as shown in the range L of FIG. 1.

It is an object of the present invention to provide an image formation device that can provide clear outlines of characters and figures while maintaining the gradation of photographs.

It is another object of the present invention to provide an image formation device that enables the smoothing technique to be applied to binarization images.

SUMMARY OF THE INVENTION

An image formation device according to the present invention is comprised of a matrix formation circuit, a pixel identification circuit, a binarization processing circuit, a halftone processing circuit, and a synthesizing circuit.

The matrix formation circuit forms a data matrix window comprising m×n (e.g. 3×3) pixels. The window is shifted successively in pixels such that an objective pixel at a predetermined location of the data matrix window travels all the scanning lines.

The pixel identification circuit determines whether the objective pixel is a binary or a halftone by determining whether each of the pixel signals in the data matrix window is a binary or a halftone. If the objective pixel is determined to be a binary, the binarization processing circuit converts the objective pixel signal to a pulse signal with a pulse width obtained by binarization processing. If the objective pixel is determined to be a halftone, the halftone processing circuit converts the objective pixel signal to a pulse signal with a pulse width obtained by halftone processing. In this manner, input multivalued pixel data is classified into a binary and a halftone correctly.

Finally, the synthesizing circuit synthesizes the pulse signals generated by the binarization processing and the halftone processing circuits to form the image signal fed into a laser printing system.

In the pixel identification circuit, preferably, the objective pixel is determined to be a halftone if the objective pixel is not binary or if the objective pixel is a binary and no binary pixel is included in the surrounding pixels, and the objective pixel is determined to be a binary if the objective pixel is a binary and at least one binary is included in the surrounding pixels. Another identification method is possible such that the objective pixel is determined to be a halftone if the objective pixel is not binary or if the objective pixel is a binary and at least one halftone pixel is included in the surrounding pixels, and the objective pixel is determined to be a binary if the objective pixel is a binary and no halftone is included in the surrounding pixels.

Preferably, the binarization processing includes smoothing such that the pulse width of the pulse signal is adjusted to smooth jagged appearance of an outline if the objective pixel is on the outline.

BRIEF DESCRIPTION OF THE DRAWINGS

FIG. 6A is a schematic diagram showing a matrix of pixel data signals fed into the pixel identification circuit 4;

FIG. 6B is a schematic diagram showing a matrix of binary pixel detection results detected by binary pixel detection circuits 41–49 and fed into a determination circuit 40;

DETAILED DESCRIPTION OF THE PREFERRED EMBODIMENTS

First of all, assuming hereinafter that one pixel is comprised of eight bits (258 gradations) and one matrix is comprised of 3×3 pixels.

Figure 1:
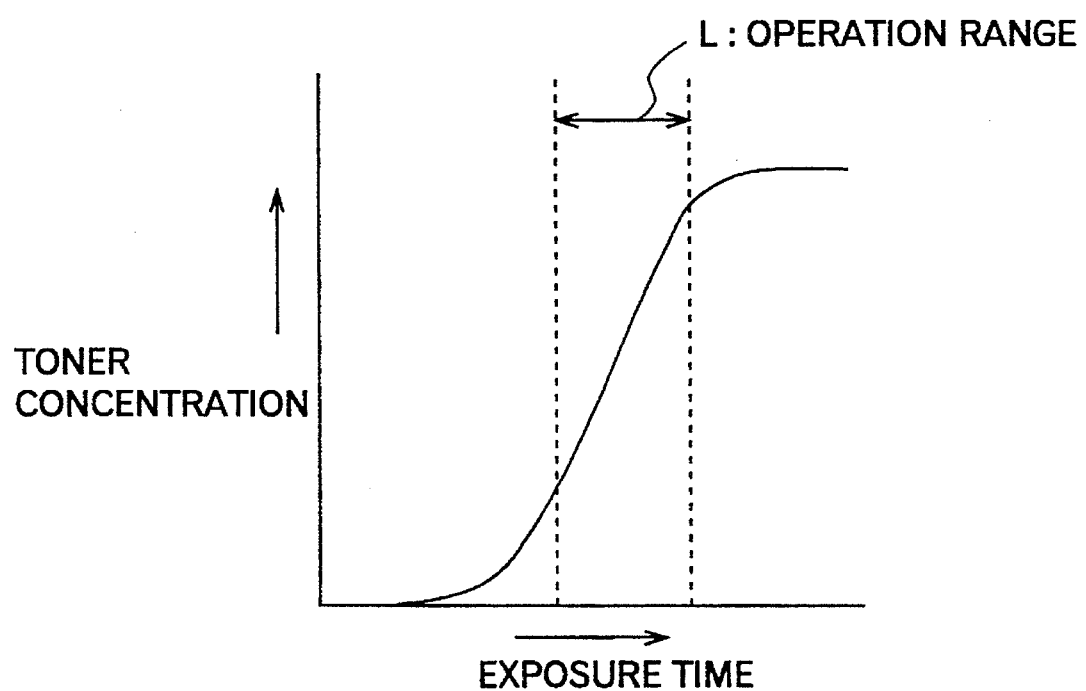
FIG. 1 is a graph illustrating toner concentration varying with exposure time, where the range L is used to operate a conventional image formation circuit.
Figure 2:
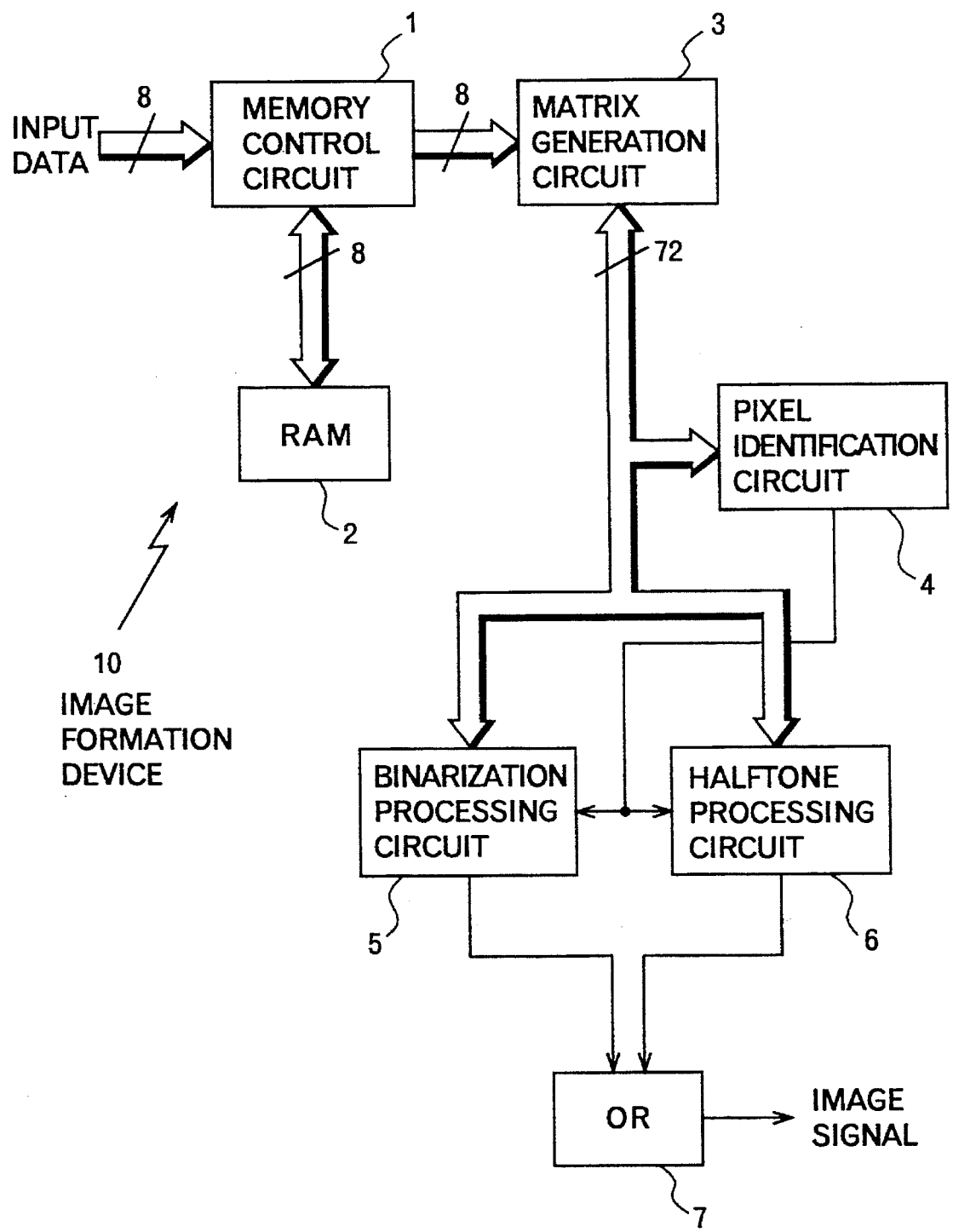
FIG. 2 is a block diagram showing an image formation device in accordance with an embodiment of the present invention.

Referring to FIG. 2, the image formation device 10 is comprised of a memory control circuit 1, a random access memory (RAM) 2, a matrix generation circuit 3, a pixel identification circuit 4, a binarization processing circuit 5, a halftone processing circuit 6, and a logical OR circuit 7.

Input data signals with eight bits per pixel are written onto the RAM 2 and then are read in different form from the RAM 2 by means of the memory control circuit 1. Receiving the data from the RAM 2, the matrix generation circuit 3 successively forms a matrix of 3×3 pixels to output it to the pixel identification circuit 4, the binarization processing circuit 5, and the halftone processing circuit 6. The pixel identification circuit 4 decides whether an objective pixel is a binary pixel or a halftone pixel, as described later. According to the decision of the pixel identification circuit 4, the objective pixel is processed by either the binarization processing circuit 5 or the halftone processing circuit 6.

The binarization processing circuit 5 performs known binarization processes such as transformation of a multivalued pixel matrix to a binary pixel matrix and smoothing of outlines, and then generates image signals with pulse widths reproducing a binary image. The halftone processing circuit 6 performs known halftone processes and generates image signals with pulse widths reproducing a halftone image.

Figure 3A:
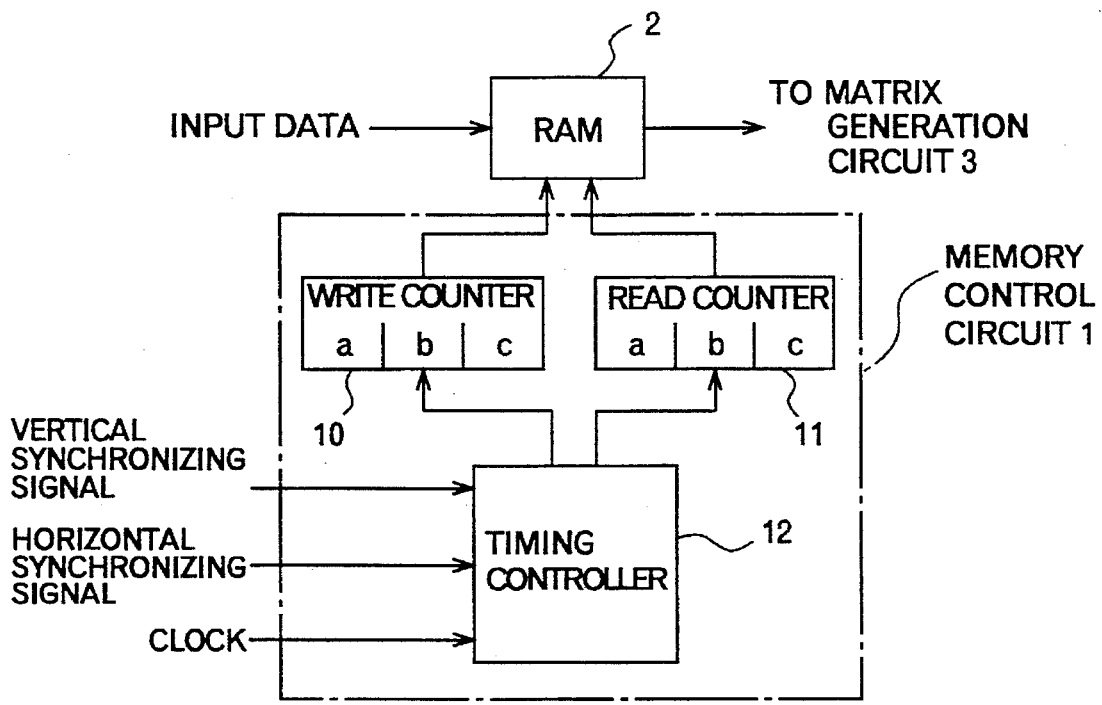
FIG. 3A is a block diagram showing a configuration of a memory control circuit 1 in the present embodiment.
Figure 3B:
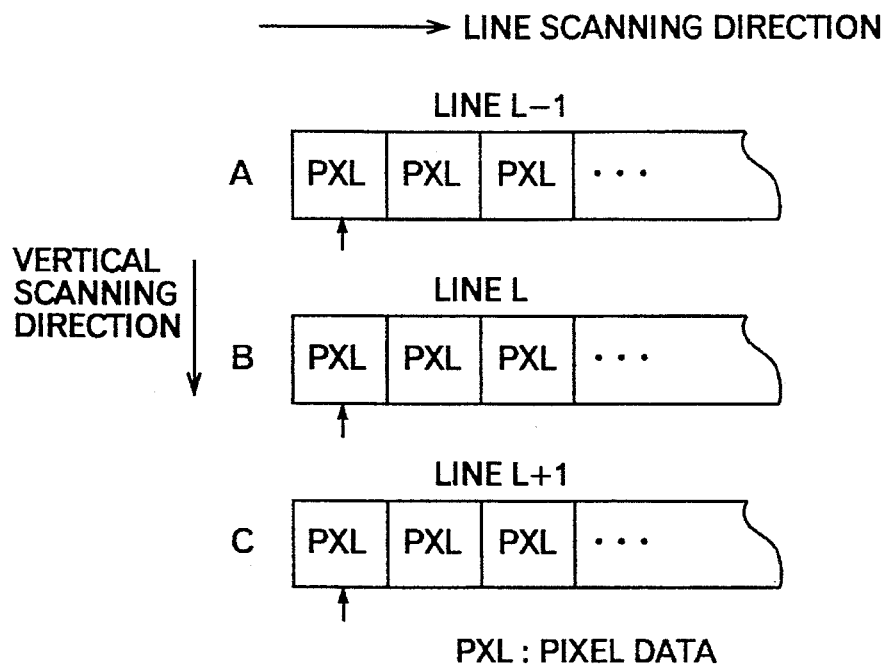
FIG. 3B is a schematic diagram showing an area configuration of a random access memory 2 in the present embodiment.

As illustrated in FIG. 3A and 3B, the memory control circuit 1 has three sets of write counters 10a to 10c and read counters 11a to 11c to divide the RAM 2 into three areas A, B, and C. Input data signals with eight bits per pixel are written onto the RAM 2 by means of the write counters 10a to 10c so that the data is stored for each scanning line sequentially in area A, area B, area C, and returned to area A, and so on.

In FIG. 3B, if line L containing an objective pixel is stored in the area B, the read counters 11a to 11c continuously read three leading pixels (each having eight bits) stored in the respective areas A to C at the time when writing of line L+1 to the area C has finished and input of line L+2 starts. According to the write counter 10a the input data of line L+2 is written onto the same location of the area A as where pixel data has been just read out. Similarly, each time three pixels in the vertical scanning direction are read out by means of the read counters 11a to 11c, input pixels are written onto the area A by the write counter 10a. If line L containing an objective pixel is stored in area A or C, the only difference in operation is the sequence of reading by read counters 11a to 11c and the selection of write counters 10a to 10c.

Figure 4:
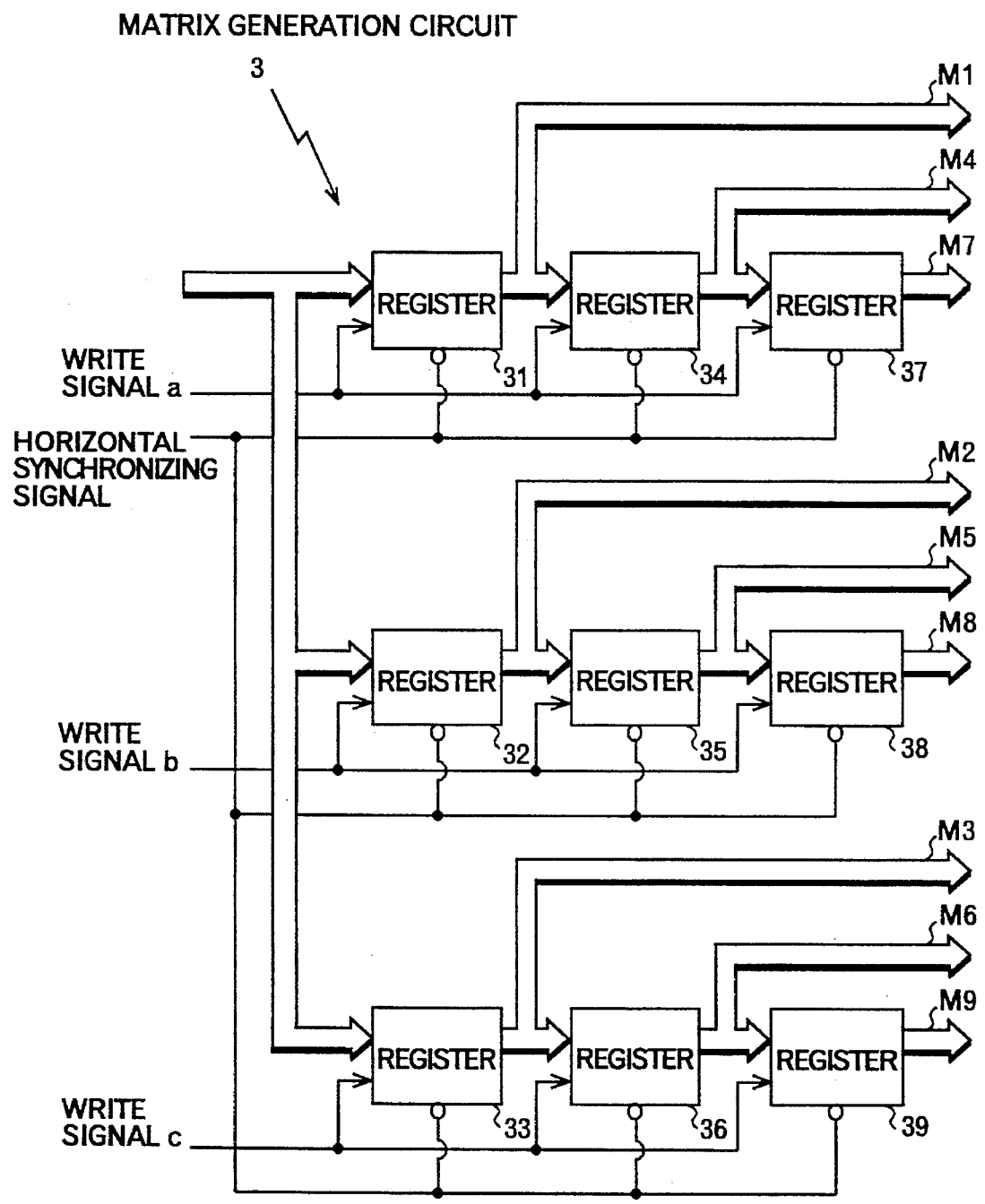
FIG. 4 is a block diagram showing a configuration of a matrix generation circuit 3 in the present embodiment.

As shown in FIG. 4, the matrix generation circuit 3 has 9 eight-bit registers 31 to 39 forming a matrix of 3×3 pixels. The register 35 retains the objective pixel while others retain reference pixels. Registers 31 to 39 are cleared by a horizontal synchronizing signal indicating the beginning of a line.

After the registers have been reset by the horizontal synchronizing signal, a single pixel of the respective lines L−1, L, and L+1 is continuously transferred from the RAM 2 to the registers 31, 32, and 33. In other words, three pixels of lines L−1, L, and L+1 are successively retained in the registers 31, 32, and 33, respectively. At the same time, values in registers 31 and 34 are transferred to the registers 34 and 37, respectively. That is, registers 31, 34, and 37 constitute a shift register on an eight-bit basis. The same applies to registers 32, 35, and 38, and registers 33, 36, and 39.

In this manner, input pixels are rearranged to form a window of 3×3 pixels, which is shifted in pixels successively in the line scanning direction. When scanning is finished for one line, the window moves to the next line, and so on. An objective pixel is always stored in the register 35. All the outputs M1–M9 of the registers 31 to 39 are transferred to the pixel identification circuit 4.

Figure 5:
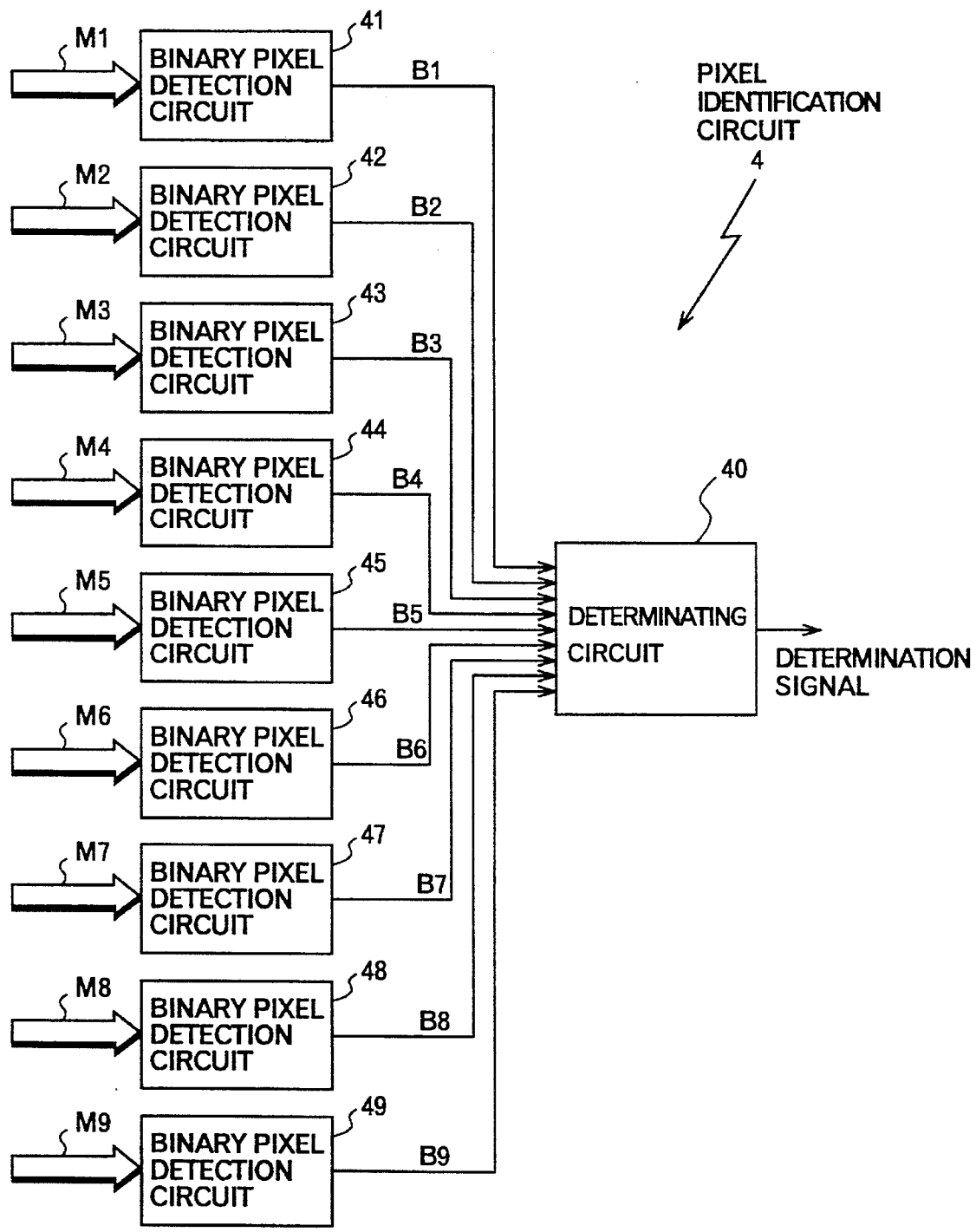
FIG. 5 is a block diagram showing a configuration of a pixel identification circuit 4 in the present embodiment.

Referring to FIG. 5, the pixel identification circuit 4 has binary pixel detection circuits 41 to 49 to which the outputs M1–M9 of registers 31–39 are input, respectively. Each of the binary pixel detection circuits 41 to 49 determines whether the eight bits of the corresponding one of the outputs M1–M9 are all 0 or 1. In other words, the binary pixel detection circuits 41–49 detect binary pixels among multivalued pixels. The detection results B1–B9 are input to the determination circuit 40 to determine whether the objective pixel should be subject to binarization or halftone processing.

FIG. 6A shows a matrix of pixels M1–M9 fed into the pixel identification circuit 4 and FIG. 6B shows a matrix of detection results B1–B9 fed into the determination circuit 40, respectively corresponding to the pixels M1–M9.

Figure 6C:
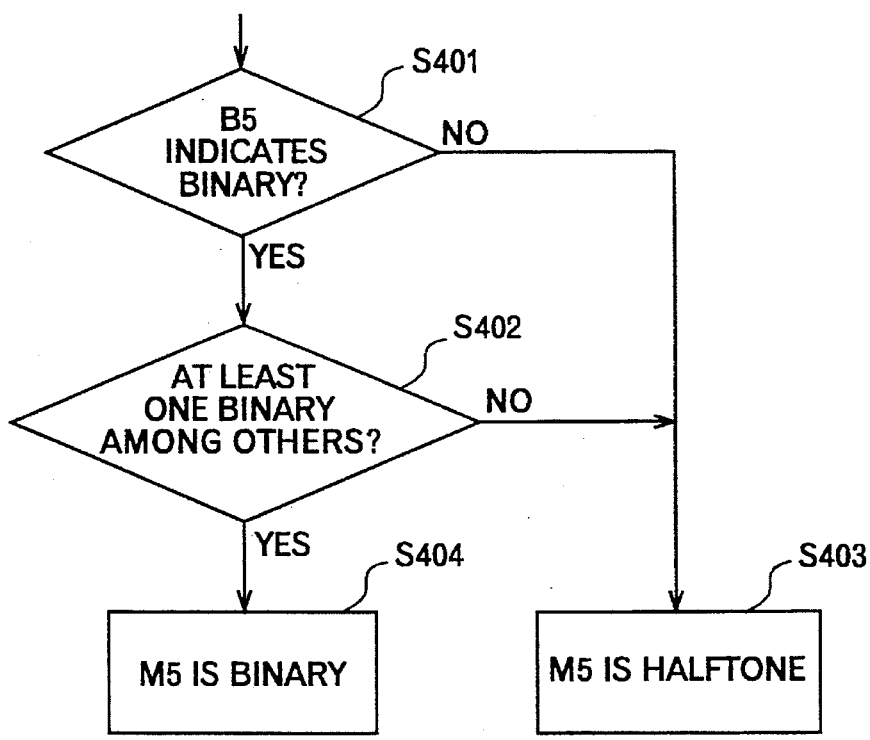
FIG. 6C is a flow chart showing an operation of the determination circuit 40.

Referring to FIG. 6C, if the detection result B5 of the binary pixel detection circuit 45 indicates that M5 is not binary (No of S401), the determination circuit 40 unconditionally determines that the objective pixel M5 is a halftone (S403). If the result B5 indicates that the objective pixel is binary (Yes of S401), the determination circuit 40 references the other results B1–B4 and B6–B9 (S402). If there is at least one binary pixel among the other results (Yes of S402), the determination circuit 40 then determines that the objective pixel is binary (S404). If no binary pixel is detected (No of S402), it determines that the objective pixel is a halftone (S403).

Figure 6D:
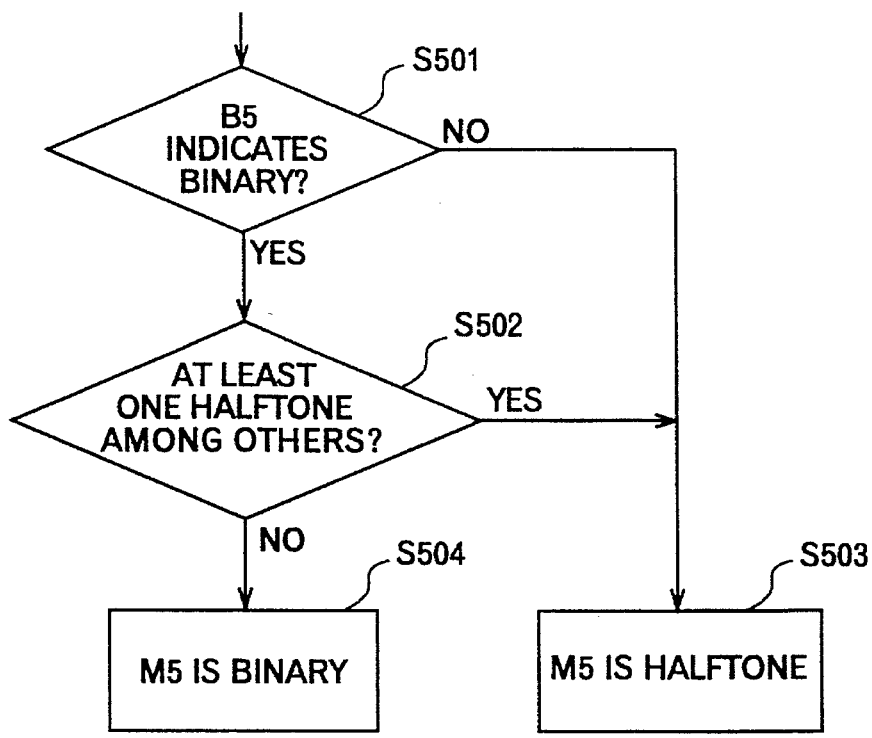
FIG. 6D is a flow chart showing another operation of the determination circuit 40.

It should be noted that the determination method of objective pixel may be varied depending on what kind of printer or software application is employed. Referring to FIG. 6D, for example, when the detection result B5 indicates that the objective pixel is binary (Yes of S501), if there is at least one halftone pixel among B1–B4 and B6–B9 (Yes of S502), the objective pixel is determined to be a halftone (S503). As another example, the objective pixel may be determined to be a halftone if the respective differences between the objective pixel and the other pixels are all within a certain dynamic range.

If the pixel identification circuit 4 determines that the objective pixel is binary, the objective pixel is converted to a pulse signal by the binarization processing circuit 5. In the binarization processing circuit 5, a matrix of 3×3 multivalued pixels received from the matrix generation circuit 3 is converted to a matrix of 3×3 binarization pixels. The conversion from a multivalued pixel matrix to a binarization pixel matrix is made such that, when all bit values of a multivalued pixel are 1, the value of binarization pixel is 1 and, otherwise, the value of binarization pixel is 0.

Using the 3×3 binarization matrix, it is determined whether the objective pixel is on an outline and, if so, it will further be determined whether the location of the objective pixel is at an edge. If it is not at an edge, the pulse width of the pulse signal to be output is controlled to smooth the undesirable jagged appearance of the outlines.

Figure 7A:
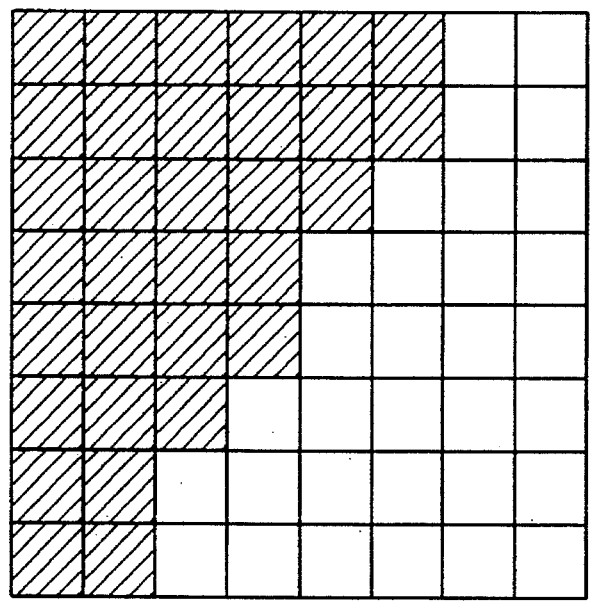
FIG. 7A is a schematic diagram showing an jagged outline appearance without smoothing.
Figure 7B:
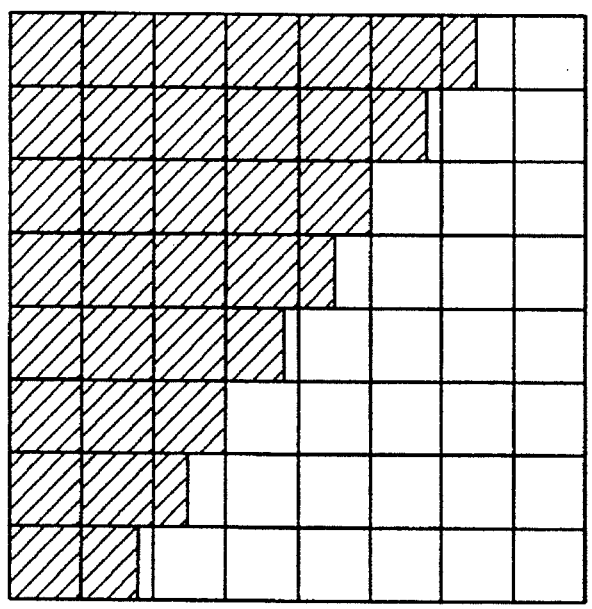
FIG. 7B a schematic diagram showing an outline appearance with smoothing.

FIG. 7A shows the jagged appearance of an outline without smoothing and FIG. 7B shows the basic concept of the smoothing processing. Referring to FIG. 7B, when the objective pixel is on the outline, the pulse width is adjusted in the line scanning direction so as to smooth jaggies.

If the pixel identification circuit 4 determines that the objective pixel is a halftone, the objective pixel is converted to a pulse signal by the halftone processing circuit 6. The number of gradations that can be reproduced by an electrophotographic printer is usually smaller than that of input multivalued pixel data. The halftone processing circuit 6 thus assembles several pixels to form a cell, and rearranges the gradation of the whole cell by using a combination of the gradations of pixels in the cell. In this embodiment, only 3×3 cells are formed, and the halftone processing circuit 6 generates a pulse width predetermined in a lookup table (not shown) based on the gradation value of the objective pixel and the coordinates of the objective pixel in the cell.

The logical OR circuit 7 calculates the OR of the pulse signals output by the binarization processing circuit 5 and the halftone processing circuit 6 to output the result as an image signal to a printing system (not shown). Such an image signal, as described before, causes a laser beam to switch on and off, enabling an image containing photographs and characters to be reproduced in high quality.

Although the present embodiment has been described with an example of a matrix of 3×3 pixels, a larger size of matrix may be employed. Such a larger matrix increases the ability of the pixel identification circuit 4 to determine whether the pixel is a binary or a halftone and the ability of the binarization processing circuit 5 to determine whether or not the pixel is on the outline and, further, on the edge, and further increases the number of pixels included in a cell in the halftone processing circuit 6.

As described above, the image formation device according to the present invention makes a distinction between a binary pixel and a halftone pixel. Therefore, when images with photographs, characters, and figures are printed, the image formation device can provide clear outlines of characters and/or figures while maintaining the gradation of photographs, and also enables the smoothing technique to be applied to binarization images, resulting in high quality printed images.

I claim:

1. In an electrophotographic printer for forming a visible image based on an image signal including a plurality of pulse signals, an image formation device for forming the image signal based on input pixel signals each having a predetermined number of bits, the image formation device comprising:

matrix formation means for forming a data matrix window having a predetermined number of pixels in the primary scanning direction and the predetermined number of pixels in the secondary scanning direction, the data matrix window shifting successively in units of a pixel;

pixel identification means for determining whether an objective pixel at a predetermined location of the data matrix window is a binary or a halftone, based on an objective pixel signal and surrounding pixel signals in the data matrix window;

first conversion means for converting the objective pixel signal to a pulse signal with a pulse width obtained by binarization processing if the objective pixel is determined to be a binary by the pixel identification means;

second conversion means for converting the objective pixel signal to a pulse signal with a pulse width obtained by halftone processing if the objective pixel is determined to be a halftone by the pixel identification means; and synthesizing means for synthesizing the plurality of pulse signals generated by the first and second conversion means to form the image signal;

the pixel identification means including:

first determination means for determining whether each pixel signal in the data matrix window is a binary or a halftone; and second determination means for determining whether the objective pixel is a binary or a halftone using the determination results obtained by the first determination means.

2. The image formation device as set forth in claim 1, wherein the second determination means operates in such a way that the objective pixel is determined to be a halftone if the objective pixel is not binary or if the objective pixel is a binary and no binary pixel is included in surrounding pixels, and the objective pixel is determined to be a binary if the objective pixel is a binary and at least one binary is included in surrounding pixels.

3. The image formation device as set forth in claim 1, wherein the second determination means operates in such a way that the objective pixel is determined to be a halftone if the objective pixel is not binary or if the objective pixel is a binary and at least one halftone pixel is included in surrounding pixels, and the objective pixel is determined to be a binary if the objective pixel is a binary and no halftone is included in surrounding pixels.

4. In an electrophotographic printer for forming a visible image based on an image signal including a plurality of pulse signals, an image formation device for forming the image signal based on input pixel signals each having a predetermined number of bits, the image formation device comprising:

matrix formation means for forming a data matrix window having a predetermined number of pixels in the primary scanning direction and the predetermined number of pixels in the secondary scanning direction, the data matrix window shifting successively in units of a pixel;

pixel identification means for determining whether an objective pixel at a predetermined location of the data matrix window is a binary or a halftone, based on an objective pixel signal and surrounding pixel signals in the data matrix window;

first conversion means for converting the objective pixel signal to a pulse signal with a pulse width obtained by binarization processing if the objective pixel is determined to be a binary by the pixel identification means;

second conversion means for converting the objective pixel signal to a pulse signal with a pulse width obtained by halftone processing if the objective pixel is determined to be a halftone by the pixel identification means; and synthesizing means for synthesizing the plurality of pulse signals generated by the first and second conversion means to form the image signal;

the binarization processing in the first conversion means including smoothing such that the pulse width of the pulse signal is adjusted to smooth a jagged appearance of an outline if the objective pixel is on the outline.

5. In an electrophotographic printer for forming a visible image based on an image signal including a plurality of pulse signals, a method of forming the image signal based on input pixel signals each having a predetermined number of bits, the method comprising the steps of:

forming a data matrix window having a predetermined number of pixels in the primary scanning direction and the predetermined number of pixels in the secondary scanning direction, the data matrix window shifting successively in units of a pixel;

determining whether an objective pixel at a predetermined location of the data matrix window is a binary or a halftone, based on an objective pixel signal and surrounding pixel signals in the data matrix window;

converting the objective pixel signal to a pulse signal with a pulse width obtained by binarization processing if the objective pixel is determined to be a binary;

converting the objective pixel signal to a pulse signal with a pulse width obtained by halftone processing if the objective pixel is determined to be a halftone; and synthesizing the plurality of pulse signals generated by the first and second conversion means to form the image signal;

the step of determining whether the objective pixel is a binary or a halftone, further including:

a first step of determining whether each pixel signal in the data matrix window is a binary or a halftone; and a second step of determining whether the objective pixel is a binary or a halftone using the determination results obtained by the first step.

6. The method as set forth in claim 5, wherein the second step is that the objective pixel is determined to be a halftone if the objective pixel is not binary or if the objective pixel is a binary and no binary pixel is included in surrounding pixels, and the objective pixel is determined to be a binary if the objective pixel is a binary and at least one binary is included in surrounding pixels.

7. The method as set forth in claim 5, wherein the second step is that the objective pixel is determined to be a halftone if the objective pixel is not binary or if the objective pixel is a binary and at least one halftone pixel is included in surrounding pixels, and the objective pixel is determined to be a binary if the objective pixel is a binary and no halftone is included in surrounding pixels.

8. In an electrophotographic printer for forming a visible image based on an image signal including a plurality of pulse signals, a method of forming the image signal based on input pixel signals each having a predetermined number of bits, the method comprising the steps of:

forming a data matrix window having a predetermined number of pixels in the primary scanning direction and the predetermined number of pixels in the secondary scanning direction, the data matrix window shifting successively in units of a pixel;

determining whether an objective pixel at a predetermined location of the data matrix window is a binary or a halftone, based on an objective pixel signal and surrounding pixel signals in the data matrix window;

converting the objective pixel signal to a pulse signal with a pulse width obtained by binarization processing if the objective pixel is determined to be a binary;

converting the objective pixel signal to a pulse signal with a pulse width obtained by halftone processing if the objective pixel is determined to be a halftone; and synthesizing the plurality of pulse signals generated by the first and second conversion means to form the image signal;

the binarization processing including smoothing such that the pulse width of the pulse signal is adjusted to smooth a jagged appearance of an outline if the objective pixel is on the outline.

9. In an electrophotographic printer for forming visible image based on an image signal including a plurality of pulse signals, an image formation device for forming the image signal based on input pixel signals each having a predetermined number of bits, the image formation device comprising:

a matrix formation device to form a data matrix window having a predetermined number of pixels in the primary scanning direction and the predetermined number of pixels in the secondary scanning direction, the data matrix window shifting successively in units of a pixel;

a pixel identification device to determine whether an objective pixel at a predetermined location of the data matrix window is a binary or a halftone, based on an objective pixel signal and surrounding pixel signals in the data matrix window;

a first conversion device to convert the objective pixel signal to a pulse signal with a pulse width obtained by binarization processing if the objective pixel is determined to be a binary by the pixel identification device;

a second conversion device to convert the objective pixel signal to a pulse signal with a pulse width obtained by halftone processing if the objective pixel is determined to be a halftone by the pixel identification device; and a synthesizing device for synthesizing the plurality of pulse signals generated by the first and second conversion devices to form the image signal;

the pixel identification device including:

a first determination device to determine whether each pixel signal in the data matrix window is a binary or a halftone; and a second determination device to determine whether the objective pixel is a binary or a halftone using the determination results obtained by the first determination device.

10. The image formation device as set forth in claim 9, wherein the second determination device operates in such a way that the objective pixel is determined to be a halftone if the objective pixel is not binary or if the objective pixel is a binary and no binary pixel is included in surrounding pixels, and the objective pixel is determined to be a binary if the objective pixel is a binary and at least one binary is included in surrounding pixels.

11. The image formation device as set forth in claim 9, wherein the second determination device operates in such a way that the objective pixel is determined to be a halftone if the objective pixel is not binary or if the objective pixel is a binary and at least one halftone pixel is included in surrounding pixels, and the objective pixel is determined to be a binary if the objective pixel is a binary and no halftone is included in surrounding pixels.

12. In an electrophotographic printer for forming visible image based on an image signal including a plurality of pulse signals, an image formation device for forming the image signal based on input pixel signals each having a predetermined number of bits, the image formation device comprising:

a matrix formation device to form a data matrix window having a predetermined number of pixels in the primary scanning direction and the predetermined number of pixels in the secondary scanning direction, the data matrix window shifting successively in units of a pixel;

a pixel identification device to determine whether an objective pixel at a predetermined location of the data matrix window is a binary or a halftone, based on an objective pixel signal and surrounding pixel signals in the data matrix window;

a first conversion device to convert the objective pixel signal to a pulse signal with a pulse width obtained by binarization processing if the objective pixel is determined to be a binary by the pixel identification device;

a second conversion device to convert the objective pixel signal to a pulse signal with a pulse width obtained by halftone processing if the objective pixel is determined to be a halftone by the pixel identification device; and a synthesizing device for synthesizing the plurality of pulse signals generated by the first and second conversion devices to form the image signal;

the binarization processing in the first conversion device including smoothing such that the pulse width of the pulse signal is adjusted to smooth a jagged appearance of an outline if the objective pixel is on the outline.

* * * * *